United States Patent Office 3,651,082
Patented Mar. 21, 1972

3,651,082
PROCESS FOR THE PRODUCTION OF HALOGEN-CONTAINING COBALT-PHTHALOCYANINE DERIVATIVES
Peter Mertens, Cologne-Marienburg, and Heinrich Vollmann, Leverkusen, Germany, assignors to Farbenfabriken Bayer Aktiengesellschaft, Leverkusen, Germany
No Drawing. Filed Aug. 28, 1968, Ser. No. 755,825
Claims priority, application Germany, Aug. 31, 1968,
F 53,374
Int. Cl. C09b 47/04
U.S. Cl. 260—314.5                                    11 Claims

ABSTRACT OF THE DISCLOSURE

Cobalt phthalocyanine complex compounds having one or more halogen atoms linked directly to the cobalt atom are prepared by reacting a cobalt phthalocyanine dispersed in an organic liquid free of hydroxy and amino groups and inert to the reactant with a halogenating agent.

---

The present invention relates to a process for the production of halogen-containing cobalt - phthalocyanine complex compounds. More particularly it concerns a process for the production of halogen-containing cobalt-phthalocyanine complex compounds in which the halogen atoms are linked to the cobalt atom.

It has been found that such halogen-containing complex compounds of the cobalt-phthalocyanine series are obtained by treating optionally substituted cobalt-phthalocyanines with halogens or halogenating agents.

It is possible to use for the process according to the invention, besides cobalt-phthalocyanine also substituted cobalt-phthalocyanines, for example, those which are substituted in their benzene nuclei by lower alkyl radicals, such as methyl, ethyl or propyl radicals or a phenyl radical or chlorine or bromine atoms.

Besides the halogens, such as chlorine, bromine and iodine, there may also be used halogenating agents, such as disulphur dichloride, mixtures of one sulphur atom with two chlorine atoms, disulphur dichloride, thionyl chloride, sulphuryl chloride, phosphorus pentachloride or phosphorus oxychloride. The reaction is preferably carried out in a dispersing agent which is inert under the conditions of the reaction, such as carbon tetrachloride, chloroform, nitrobenzene, chlorobenzene, o-dichlorobenzene or trichlorobenzene. The reaction can be carried out at temperatures of 0–150° C., preferably of 20–80°. Since the halogens or halogenating agents may halogenate the cobalt-phthalocyanine or its derivatives also in the benzene nuclei of the perhalocyanine ring system under stronger reaction conditions, it is expedient to choose reaction conditions under which, according to the reactivity of the halogens or halogenating agents used, no noticeable halogenation of the benzene nuclei takes place, provided halogenation is not desired. Accordingly, the dispersing agents are so chosen that they act as inert dispersing agents under the reaction conditions concerned. The inert dispersing agents should be free from hydroxyl and amino groups.

The treatment with halogens or halogenating agents is expediently performed for at least such a period of time that unchanged starting material is practically no longer present. Depending upon the duration of the reaction and the type of halogen, there are obtained products containing one, two or three halogen atoms. In the case of a prolonged reaction, halogenation may also occur in the nucleus of the cobalt-phthalocyanine. The process according to the invention preferably yields products which contain two halogen atoms.

The products are compounds which contain the halogen atoms linked to the central cobalt atom. In the case of the dihalogen compound, for example, the compounds can therefore be illustrated by the following formula

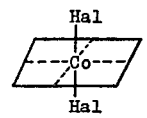

In this formula the rhomb is a simplified illustration of a cyclo - tetra - imino - isoindolenine of the following formula:

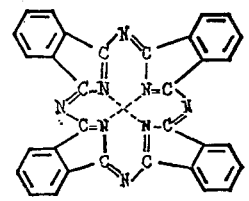

It is in complete agreement with this conception of the structure that a test according to J. A. Elvidge ("A Micromethod for the Determination of the Valency of a Metal in a Phthalocyanine-Complex," Soc. 1961, 869–871) yields values which prove the metal to be nonvalent in relation to the macroring.

By reduction of the compounds obtained according to the invention, preferably in high boiling inert dispersing agents, such as dimethyl-aniline or quinoline, with the addition of some hydroquinone, well crystallised cobalt-phthalocyanine is formed from the halogen compound according to the invention, the halogen being completely eliminated. When the procedure for this reduction is quantitative, a numeric value is obtained, which indicates how many grams of metal-phthalocyanine are obtained from 100 g. halogen compound. The number obtained is called "reduction number" (abbrev. "RZ"). It is possible to calculate the molecular weight of the complex under investigation from this number and the known molecular weight of the metal-phthalocyanine with satisfactory accuracy according to the following equation:

$$\text{Molecular weight} = \frac{100.571 \ (=\text{M.W. CoPc})}{RZ}$$

The products obtained according to the invention can be used, for example, as dyestuff intermediates.

In the following examples, the parts are parts by weight unless otherwise stated. The symbol CoPc stands for cobalt-phthalocyanine. The RZ-number (reduction number) stated in each case is determined as described above.

EXAMPLE 1

(a) 571 parts of finely divided cobalt-phthalocyanine are suspended in 2500 parts by volume of dry o-dichlorobenzene in a flask fitted with stirrer, thermometer, gas feed tube and waste gas tube. With the stirrer at a standstill, the air over the suspension is first partially driven off by means of chlorine, and chlorine is then passed into the closed flask with good stirring. The reaction which can be observed by checking the rate of chlorine absorption proceeds very fast, while the temperature rises to 40–50° C. A high excess pressure of the chlorine is not required, since the chlorine is rapidly absorbed provided the mixture is well stirred. The absorption can be recognised by the fact that interruption of the chlorine current leads to the formation of a substantial vacuum in the reaction vessel within a short time. After about ½ hour, when the reaction mixture has absorbed 76–80 g. chlorine, the chlorine absorption becomes very slow. The chlorine current is then switched off, stirring is continued at 40° C. for ½ hour and the excess chlorine is removed by passing dry air over the suspension. The product is then filtered off with suction, washed with o-dichlorobenzene and dried at 100° C. in a vacuum.

There are obtained 650 parts (theoretical yield 642 parts) of a black-brown powder the small crystals of which exhibit a slight brass lustre. It is insoluble in aliphatic and aromatic hydrocarbons, halogenated hydrocarbons and ethers. Analysis shows a chlorine content of 10.6% (theory 11.0%). RZ calculated 89, found 87.5.

(b) If the chlorination is carried out at 90–100° C., instead of at 20–45° C., then there is again obtained an excellent yield of a black-brown product which is largely similar to the one prepared at a low temperature. However, the CoPc regenerated therefrom by boiling in dimethyl-aniline already contains some (3–4%) chlorine in the benzene rings of the phthalocyanine ring system.

EXAMPLE 2

If the chlorination of CoPc described in Example 1(a) is repeated, but using chlorobenzene, instead of o-dichlorobenzene, then the course of the reaction is completely the same, particularly the automatic stoppage of the chlorine absorption after a little more than two gram-atoms of chlorine have been taken up per mol CoPc and the formation of a dark brown reaction product which is free from CoPc. However, the product which is isolated in a yield of 746 parts by suction-filtration, washing with chlorobenzene, then thoroughly with benzene, and drying in a vacuum at 60–70° C., exhibits a chlorine content of 13.8%, and a RZ of 74.3. The RZ and the high yield indicate a content of firmly bound chlorobenzene. As can be seen from the total analysis, the dichloro-CoPc formed in this case contains 1 mole of bound monochlorobenzene per mole. The yield of 746 parts corresponds to a yield of 99% of the theoretical amount referred to a molecular weight of 755.

Calculated for $C_{38}H_{21}N_8Cl_3Co$ (percent): M.W., 755. C, 60.45; H, 2.80; N, 14.85; Cl, 14.09; Co, 7.81. Found values (percent): C, 60.3; H, 2.9; N, 14.8; Cl, 13.8; Co, 7.6.

EXAMPLE 3

(a) To the suspension of 20 parts CoPc (ground technical product) in 200 parts by volume nitrobenzene there is added at about 20° C. with stirring a solution of 8 parts bromine (140% of theory) in 10 parts by volume nitrobenzene. After further stirring at 40° C. for one hour, the product is filtered off with suction, thoroughly washed with benzene and dried at 90° C. There are obtained 25.25 parts of a dark brown crystalline powder with a greenish metal lustre; it has a bromine content of 22.1% (theoretical content for dibromo-CoPc=21.85%). The yield corresponds to 97% of theory, referred to dibromo-CoPc (molecular weight 731).

(b) When the bromination described above is not carried out in nitrobenzene, but in chloroform, and only 5.6 parts bromine (the calculated amount for the formation of a dibromo-CoPc) are added, the starting product is also completely converted into dibromo-CoPc after stirring at 40° C. for one hour. Yield after washing with chloroform and drying at 50° C. in a vacuum: 25.2 parts (98.5% of theory), bromine content 22.2% (theory: 21.85%), RZ determined as 77.0 (theory 78.1).

EXAMPLE 4

To the suspension of 57 parts CoPc in 380 parts by volume of dry nitrobenzene 30 parts iodine are added, and the mixture is heated to 120° C. After about 2 hours, the blue CoPc rodlets and needles have been transformed into finer dark brown crystals, as can easily be seen under the microscope. After cooling the product is filtered off with suction, washed with nitrobenzene and benzene, and dried at 100° C. Yield: 69 parts of a dark olive-brown crystal powder. The iodine content corresponds to a little more than one iodine atom per molecule CoPc.

EXAMPLE 5

(a) To the suspension of 57 parts CoPc in 250 parts by volume of dry nitrobenzene a solution of 15.5 parts sulphuryl chloride in 50 parts by volume nitrobenzene is added dropwise within 30 minutes. The dark, almost black suspension is stirred for a further 30 minutes, the product is filtered off with suction and washed with nitrobenzene and benzene. After drying at 100° C., a product which is identical in respect of all its properties with the one described in Example 1(a) is obtained in an excellent yield.

(b) When the 15.5 parts sulphuryl chloride are replaced with 21 parts sulphur dichloride, or the nitrobenzene is replaced with o-dichlorobenzene, then the same product is also obtained in very good yields.

EXAMPLE 6

(a) To the suspension of 57 parts CoPc in 280 parts by volume nitrobenzene 30 parts phosphorus pentachloride are added. The mixture is heated at 120° C. for 1½ hours. After cooling to room temperature the product is filtered off with suction, washed with nitrobenzene and benzene and dried at 100° C. A dark brown crystal powder is obtained with a yield of more than 95%. Chlorine content 11%. The product contains no phosphorus and is identical with the product described in Example 1(a).

(b) If the process is carried out in the same way, but with the use of 40 parts thionyl chloride or 50 parts sulphur monochloride instead of phosphorus pentachloride, then sulphur-free products are obtained in good yields which are identical with the product described in Example 1(a).

EXAMPLE 7

To the suspension of 57 parts of CoPc in 300 parts by volume nitrobenzene 50 parts phosphorus oxychloride are added, and the mixture is heated at 135° C. for 2 hours. A further 15 parts phosphorus oxychloride are then added, and the temperature of 135° C. is maintained for another hour. After stirring until cold, the product is filtered off with suction, thoroughly washed with nitrobenzene and benzene, and dried at 100° C. There are obtained 75.2 parts of a black-green powder with a chlorine content of 10.2% and a phosphorus content of 4.4%. The product is insoluble in aliphatic and aromatic hydrocarbons, halogenated hydrocarbons and ethers. It is sparingly soluble in lower alcohols.

EXAMPLE 8

To the suspension of 17.6 parts tetraphenyl-cobalt-phthalocyanine (prepared by heating 1-amino-3-imino-5-phenylisoindolenine with $CoCl_2$ in quinoline) in 85 parts by volume nitrobenzene a solution of 3.2 parts bromine in 15 parts by volume nitrobenzene is added dropwise at 15–20° C. within 30 minutes. Stirring is continued for one hour and the solvent is then removed at 40–50° C. in a vacuum. There remains a brown-black powder analysis of which shows a bromine content of 15% (calculated: 15.4% for tetraphenyl-CoPc+2 Br, molecular weight 1040) and which is completely insoluble in aliphatic and aromatic hydrocarbons, halogenated and nitrohydrocarbons and ethers.

EXAMPLE 9

30 parts CoPc with a chlorine content of 19.6% (prepared by chlorination of CoPc in an $AlCl_3/NaCl$ melt) are suspended in 150 parts by volume nitrobenzene in a three-neck flask fitted with stirrer, thermometer and gas feed tube, the air over the suspension is driven off by means of chlorine, and chlorine is then pressed into the closed vessel. An appreciable excess pressure is not required, since the chlorine absorption proceeds rapidly and is slightly exothermic. When the chlorine adsorption has subsided, stirring is continued for 1 hour at 30–40° C., the excess chlorine is driven off by means of a dry current of air, the product is filtered off with suction and thoroughly washed with benzene. After drying at 100° C. in a vacuum, there are thus obtained 32.6 g. (98.8% of theory, referred to a molecular weight of 782) of a black-brown powder which is insoluble in aliphatic and aromatic hydrocarbons, halogenated hydrocarbons and ethers. Analysis shows a chlorine content of 26.2% (calculated 26.9%).

We claim:

1. Process for the production of chlorine, bromine, or iodine-containing cobalt-phthalocyanine complex compound in which chlorine, bromine, or iodine atoms are directly and eliminatably linked to the cobalt atom consisting essentially of treating at a temperature of 0 to 150° C. a cobalt-phthalocyanine or a cobalt-phthalocyanine substituted in its benzene nucleus by a member of the class consisting of chlorine and bromine or a cobalt-phthalocyanine containing a phenyl substituent in the 4-position of a benzene residue with a halogenating agent selected from the group consisting of chlorine, bromine, iodine, sulfur dichloride, disulfur dichloride, thionyl chloride, sulfuryl chloride, phosphorus pentachloride and phosphorus oxychloride.

2. Process of claim 1 wherein the reaction temperature is 20° C. to 80° C.

3. Process of claim 2 wherein said halogenating agent is chlorine.

4. Process of claim 2 wherein the reaction is conducted in an inert dispersing agent which agent is an organic liquid free of hydroxy and amino groups.

5. Process of claim 1 wherein the halogenating agent is selected from the group consisting of chlorine and bromine and the temperature of reaction is from about 15° C. to about 50° C.

6. Process of claim 1 wherein the halogenating agent is phosphorus oxychloride and the temperature is about 135° C.

7. Process of claim 1 wherein the halogenating agent is selected from the group consisting of iodine, phosphorus pentachloride, thionyl chloride, disulphur dichloride, sulphur dichloride, and sulphuryl chloride, and the temperature is about 120° C.

8. A cobalt-phthalocyanine compound of the formula

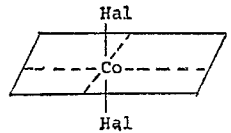

wherein Hal is Cl or Br, and

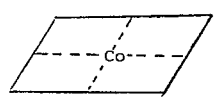

is

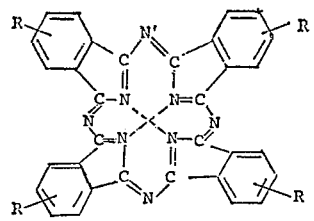

where R is phenyl, hydrogen, chlorine or bromine with the provision that if R is phenyl it is in the 4-position on the benzene nucleus.

9. A compound of claim 8 wherein Hal is Cl.

10. A cobalt-phthalocyanine complex compound having one or two chlorine, bromine or iodine atoms linked directly to the cobalt atom wherein the cobalt-phthalocyanine is selected from the group consisting of unsubstituted cobalt-phthalocyanine, 4-phenyl-substituted cobalt-phthalocyanine, chlorine substituted cobalt-phthalocyanine, and bromine substituted cobalt-phthalocyanine.

11. A complex compound of claim 10 wherein there are directly linked to the central cobalt atom two chlorine atoms or two bromine atoms and there is no other linkage to said cobalt atoms than those of the phthalocyanine structure.

References Cited

UNITED STATES PATENTS

| | | | |
|---|---|---|---|
| 3,320,276 | 5/1967 | Hamilton et al. | 260—314.5 |
| 3,231,583 | 11/1966 | Frey | 260—314.5 |
| 2,873,279 | 9/1959 | Randall et al. | 260—314.5 |
| 2,195,984 | 3/1940 | Dent et al. | 260—314.5 |

FOREIGN PATENTS

| | | | |
|---|---|---|---|
| 1,009,921 | 1965 | Great Britain | 260—314.5 |

HENRY R. JILES, Primary Examiner

H. I. MOATZ, Assistant Examiner